United States Patent
Wainwright et al.

(10) Patent No.: US 7,019,743 B1
(45) Date of Patent: Mar. 28, 2006

(54) PERFORMING OPERATIONS USING DRAG AND DROP FEATURES

(75) Inventors: John Wainwright, Los Gatos, CA (US); Frank Delise, Holtsville, NY (US); Michael Pittman, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 703 days.

(21) Appl. No.: 10/153,218

(22) Filed: May 20, 2002

Related U.S. Application Data

(60) Provisional application No. 60/293,109, filed on May 31, 2001, provisional application No. 60/291,947, filed on May 18, 2001.

(51) Int. Cl.
*G06T 15/00* (2006.01)

(52) U.S. Cl. .................. 345/420; 715/846; 707/539

(58) Field of Classification Search ................ 345/419, 345/420; 707/539; 715/739, 769, 846, 716; 703/21

See application file for complete search history.

(56) References Cited

U.S. PATENT DOCUMENTS

| | | | | |
|---|---|---|---|---|
| 5,689,664 A | * | 11/1997 | Narayanan et al. | 715/769 |
| 5,897,650 A | * | 4/1999 | Nakajima et al. | 715/539 |
| 5,900,874 A | * | 5/1999 | Shrader et al. | 715/846 |
| 5,903,271 A | * | 5/1999 | Bardon et al. | 345/419 |
| 6,278,455 B1 | * | 8/2001 | Baker | 715/716 |
| 6,289,299 B1 | * | 9/2001 | Daniel et al. | 703/21 |

OTHER PUBLICATIONS

Bragg, Which Network Design Tool Is Right for You, Sep. 2000, IT Pro, IEEE, pp. 23-35.*

* cited by examiner

*Primary Examiner*—Phu K. Nguyen
(74) *Attorney, Agent, or Firm*—Patterson and Sheridan, LLP

(57) ABSTRACT

A method and apparatus for performing operations using drag and drop features is provided. For example, a source object, which includes instructions that perform the operations, is applied to a target object, such as a graphical object or a window, by a user performing a drag and drop gesture. This can be accomplished by the user clicking on an icon or an item in a menu, which results in a representation of the source object being displayed on the user's computer. The representation moves across the display as the user performs the drag. When the user drops the representation on the intended target object, the instructions are executed and the operations are performed.

70 Claims, 7 Drawing Sheets

PERFORMING OPERATIONS USING DRAG AND DROP FEATURES

PRIORITY CLAIM AND RELATED APPLICATIONS

This application claims domestic priority from prior U.S. provisional application Ser. No. 60/291,947, entitled "Content Layout and Design Mechanism", filed May 18, 2001, naming as inventors Nikolai Sander, Scott Morrison, Britt Miura, Kells Elmquist, John Wainwright, Michael Malone, Frank Delise, Attilla Szabo, Norbert Alan Jeske, the entire disclosure of which is hereby incorporated by reference for all purposes as if fully set forth herein. This application claims domestic priority from prior U.S. provisional application Ser. No. 60/293,109, entitled "A Mechanism for Content and Design Layout", filed May 22, 2001, naming as inventors Nikolai Sander, Scott Morrison, Britt Miura, Kells Elmquist John Wainwright, Michael Malone, Frank Delise, Attilla Szabo, Norbert Alan Jeske, the entire disclosure of which is hereby incorporated by reference for all purposes as if fully set forth herein.

FIELD OF THE INVENTION

The present invention relates to computer systems and more specifically to performing operations using drag and drop features.

BACKGROUND OF THE INVENTION

Graphics applications have evolved to provide many different kinds of options to developers. Graphics applications allow developers not only the ability to create graphical objects, such as a depiction of a person, a table, or a chair, but also the ability to animate the graphical objects and to place them into scenes. As used herein, the term graphical object is an object in a graphics application that includes features that can be manipulated by the graphics application. As such, a graphical object can be fixed or animated. A person is an example of an animated object. A table and chairs are examples of non-animated objects. Typically, graphical objects are depicted as being part of a scene. Generally, a scene is a rendered object that includes a background, such as a rear wall, and graphical objects in front of the background. An example of a graphics application is 3d Studio Max® from Discreet®, a division of Autodesk, Inc.

In large production graphics projects, certain processes need to be performed repeatedly. For example, numerous graphical objects, such as tea cups, may need the same or similar types of processes applied to them, such as handles, quickly and easily. Other examples include, coordinating several processes, such as creating backgrounds and placing graphical objects on the backgrounds, installing the same files, such as images, in more than one graphics application, and placing graphical objects around another graphical object.

Two common ways of applying services to the graphical objects are (1) to navigate menus for the desired services, search in folders for dialogues, and move dialogues around, or (2) to have a tool bar of buttons where the buttons correspond to scripts. By clicking on a button, a dialogue box appears where the user specifies a target object that the script is applied to.

One way to expand the capabilities of graphics applications involves installation of additional features. For example, some plug-in developers provide additional features to graphics designers in the form of WinZip files. To install the features, a developer downloads a WinZip file from a third party developer's web site, opens the WinZip file, extracts files from the WinZip file, stores the extracted files on a hard drive and executes an installation program to install the features provided by the extracted files.

However, these approaches for applying services and installing features are manually intensive. Therefore, there is clearly a need for easily performing operations repeatedly.

SUMMARY OF THE INVENTION

Techniques are provided for performing operations using drag and drop features. For example, a source object, which includes instructions that perform the operations, is applied to a target object, such as a graphical object or a window, by a user performing a drag and drop gesture. This can be accomplished by the user clicking on an icon or an item in a menu, which results in a representation of the source object being displayed on the user's computer. The representation moves across the display as the user performs the drag. When the user drops the representation on the intended target object, the instructions are executed and the operations are performed.

According to one embodiment, the source object is a script object that includes instructions for performing operations, such as modifying the target object. According to another embodiment, the source object is a zip object. The zip object provides a mechanism for including one or more files that the instructions use to perform operations with. The instructions maybe implemented as commands in a control file, and/or in a script file included in the zip object.

According to other aspects, the invention encompasses a computer-readable medium, a carrier wave, an apparatus, and a system configured to carry out the foregoing functions.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for performing operations using drag and drop features is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A System Overview

Figure 1A:
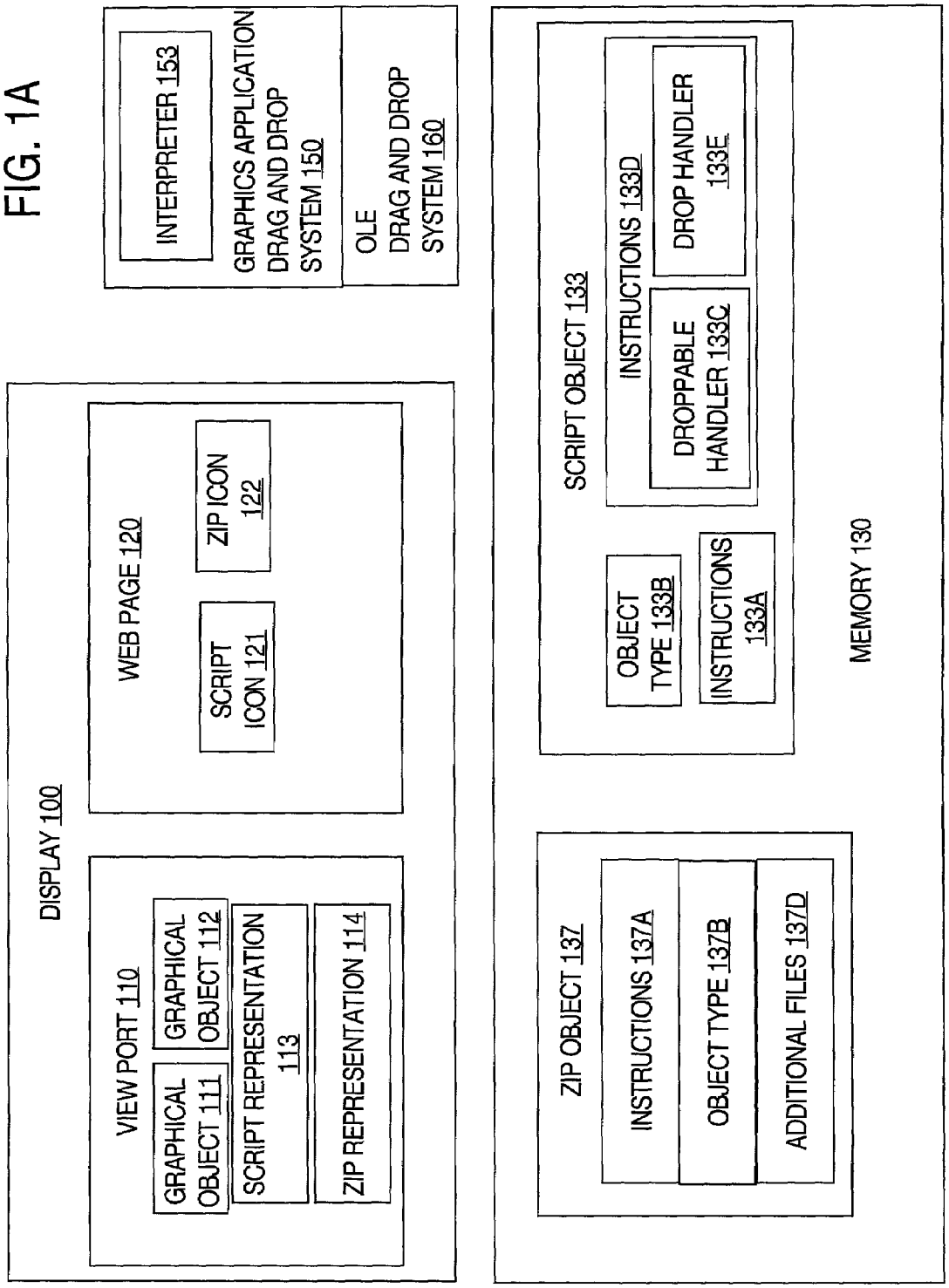
FIG. 1A is a block diagram of a system for implementing and using a script object or a zip object, according to one embodiment of the invention.

FIG. 1A is a block diagram of a system for implementing and using a script object or a zip object, according to one embodiment of the invention. Although, FIG. 1A depicts both a script object and a zip object, for purposes of explanation, other embodiments may use one or more source objects, such as a script object or a zip object. Furthermore, FIG. 1A is described with reference to two graphical objects (111, 112); however, any number of graphical objects may be used.

The system is used to display information from a memory 130, on a display 100, and to execute code (150, 160, 133a, 133b, 137a, etc.). A cathode ray tube (CRT) is an example of a display 100. Various windows, such as a view port 110 and a web page 120, are used to display information, such as graphical objects (111, 112), a script representation 113, a zip representation 114, a zip icon 122, and a script icon 121, in the display 100. Although not depicted in FIG. 1A, the display 100 may also include menu bars, and tool bars along with other related tools.

The view port 110 provides a view into a scene. A view port 110 is a part of a window and may include toolbars, for manipulating the scene and/or graphical objects that are a part of the scene, along the sides of the view port 110. For example, as depicted, the view port 110 is used to display the script representation 113, the zip representation 114, and the graphical objects (111, 112). The web page 120 is used to display the script icon 121 and the zip icon 122, which are used in the process of modifying graphical objects (111, 112). Memory 130 contains information that is represented on the display 100. For example, the graphical objects (111, 112) are visual representations of internal graphical objects, which have data and/or code associated with them, stored in memory 130.

According to one embodiment, a graphics application drag and drop system 150 is built on top of an Object Linking and Embedding™ (OLE) drag and drop system 160. The graphics application drag and drop system 150 includes among other things an interpreter 153. The OLE™ drag and drop system 160 is invoked in the event that the mouse is moved over the display 100. The OLE™ drag and drop system 160 continuously invokes the graphics application drag and drop system 150 as the user moves the mouse over the display 100. According to one embodiment, the graphics application drag and drop system 150 determines the type of the source object, such as a script object 133 or a zip object 137, when a user initiates a drag operation of a source object, as will be described in more detail hereinafter.

A user can initiate a drag operation of a script object 133 by clicking on a script icon 121, which is on the web page 120. The script representation 113 represents the script object 133 as a user drags and drops the script representation 113 across the display 100. The script object 133 includes: (1) instructions 133a used for modifying a target object such as graphical objects (111, 112), (2) an object type 133b, which indicates that the script object 133 is of type script object, and (3) instructions 133d for a droppable handler 133c and a drop handler 133e. The droppable handler 133c is used to determine whether script representation 113 may be dropped on a graphical object (111, 112). The droppable handler 133c is continuously invoked by the graphics application drag and drop system 150 as the script representation 113 is moved across the display 100 to determine if the script representation 113 may be dropped on whatever the script representation 113 is over. The droppable handler 133c performs this determination by receiving information, in the form of one or more parameters, of whatever the script representation 113 is over. For example, if the script representation 113 is over a graphical object 111, the script representation 113 receives a reference of the graphical object 111, among other things. If the script representation 113 is over a window, the script representation 113 receives a window identifier among other things. The drop handler 133e is invoked when the script representation 113 is dropped on a target object, such as graphical object (111, 112), a scene, a background, or a window among other things. The drop handler 133e performs one or more operations, such as applying a text to a graphical object 111 or causing the graphical object 111 to be animated, which involve the graphical object 111 by causing the execution of the instructions 133a.

Furthermore, a user can initiate a drag operation of a zip object 137 by clicking on a zip icon 122, which is on the web page 120. The zip representation 114 represents the zip object 137 as a user drags and drops the zip representation 114 across the display 100. The zip object 137 includes instructions 137a, an object type 137b, and additional files 137d, among other things.

Zip object 137 is a convenient way of dragging and dropping several additional files 137d onto a target object such as a graphical object (111, 112). Examples of additional files 137d are scene files, for creating or modifying scenes, image files, for creating or modifying images, script objects, etc. The object type 137b indicates that the zip object 137 is of type zip object. The instructions 137a, which may be included in a control file within zip object 137, determine what to do with the additional files 137d when the zip object 137 is dropped. For example, the instructions 137a are used for: installing additional files 137d; performing operations required by the additional files 137d, such as script objects; placing graphical objects (111, 112) on a background among other things; determining whether any of the additional files 137d need to be deleted and if so which of the additional files 137d need to be deleted; determining whether any of the additional files 137d need to be copied to a predetermined location and if so which of the additional files 137d need to be copied and to what predetermined location the additional files 137d need to be copied to. For example, according to one embodiment the instructions 137a may indicate which of the additional files 137d is a script object 133, and how to process the additional files 137d. According to one embodiment, the instructions 137a are in a script object 133 that the zip object 137 includes via the additional files 137d.

Droppable Handlers and Drop Handlers

According to one embodiment, the zip object 137 does not include a droppable handler or a drop handler directly. Instead the zip object 137 includes a script object 133 as one of the additional files 137d and uses the droppable handler 133c and the drop handler 133e in the script object 133. If instructions 137a include an instruction indicating which of the additional files 137d is a script object 133, then the zip object 133 uses droppable handler 133c and drop handler 133e in the indicated script object 133. However, if instructions 137a do not include an instruction indicating which of the additional files 137d is a script object 133, then the first script object 133 included in the zip object 137 is used. According to another embodiment, the zip object 137 includes its own droppable handler (not shown) and drop handler (not shown), in which case these handlers are invoked.

According to one embodiment, the zip object 137 does not include its own handlers (not shown) nor does the zip object 137 include a script object 133 via the additional files 137d. In this case, a default droppable handler for zip objects (hereinafter referred to as a "default zip droppable handler") and a default drop handler for zip objects (hereinafter referred to as a "default zip drop handler") are invoked as already described herein. According to one embodiment, the default zip droppable handler always returns that the zip object 137 can be dropped, and the default zip drop handler always unzips the zip object 137, in which case the additional files 137d may be placed in either a temporary directory or in a directory that is specified by the instructions 137a.

According to one embodiment, the script object 133 does not include a droppable handler 133c and/or a drop handler 133e. In this case, a default droppable handler for script objects (hereinafter referred to as a "default script droppable handler") and a default drop handler for script objects (hereinafter referred to as a "default script drop handler") are invoked instead of droppable handler 133c and drop handler 133e as already described herein. According to one embodiment, the default script droppable handler always returns that the script object 133 can be dropped, and the default script drop handler always causes the instructions 133a to be executed when the script object 133 is dropped. The script object 133 is run in the context that it is dropped, regardless of what target object the script object 133 is dropped on.

According to one embodiment, the default handlers as described in this section reside in the graphics application drag and drop system 150. According to one embodiment the functions of the droppable handler and the drop handler are in the same handler.

Using an Asset Browser to List Script Objects and Zip Objects

Figure 1B:
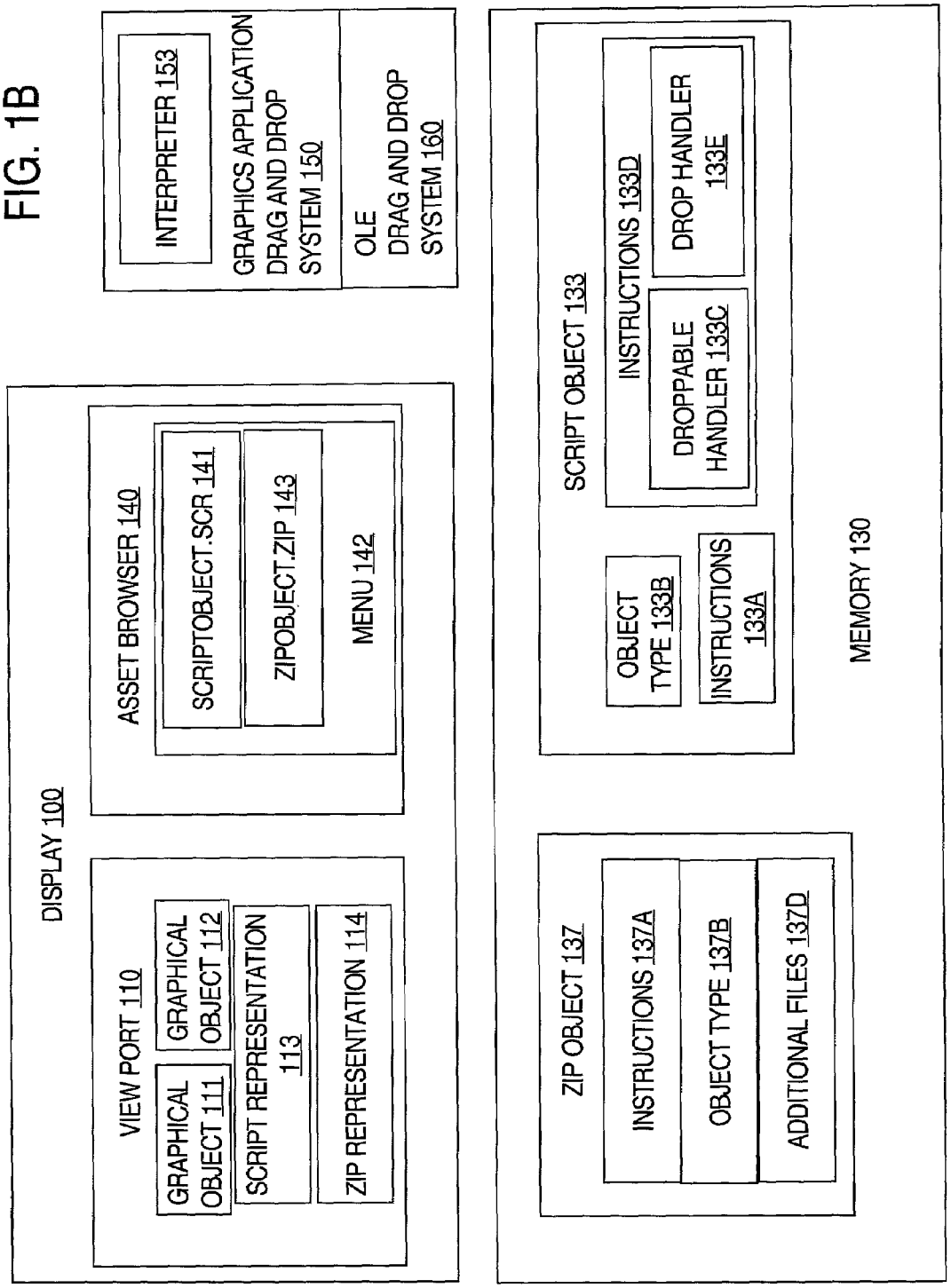
FIG. 1B is a block diagram of a system for implementing and using a script object or a zip object, according to another embodiment of the invention.

FIG. 1B is a block diagram of a system for implementing and using a script object or a zip object, according to another embodiment of the invention. FIG. 1B is largely the same as FIG. 1A, except that instead of a web page 120, FIG. 1B has an asset browser 140. An asset browser 140 is used to conveniently display items in a menu 142 that represent script objects and/or zip objects, which can be applied to target objects, such as graphical objects (111, 112), scenes, backgrounds, and windows, among other things. For example, the script object 133 is displayed as an item, called scriptobject.scr 141, in the menu 142 on the asset browser 140. Furthermore, the zip object 137 is displayed as an item, called zipobject.zip 143, in the menu 142 on the asset browser 140.

An Operational Description of Script Objects

Figure 2A:
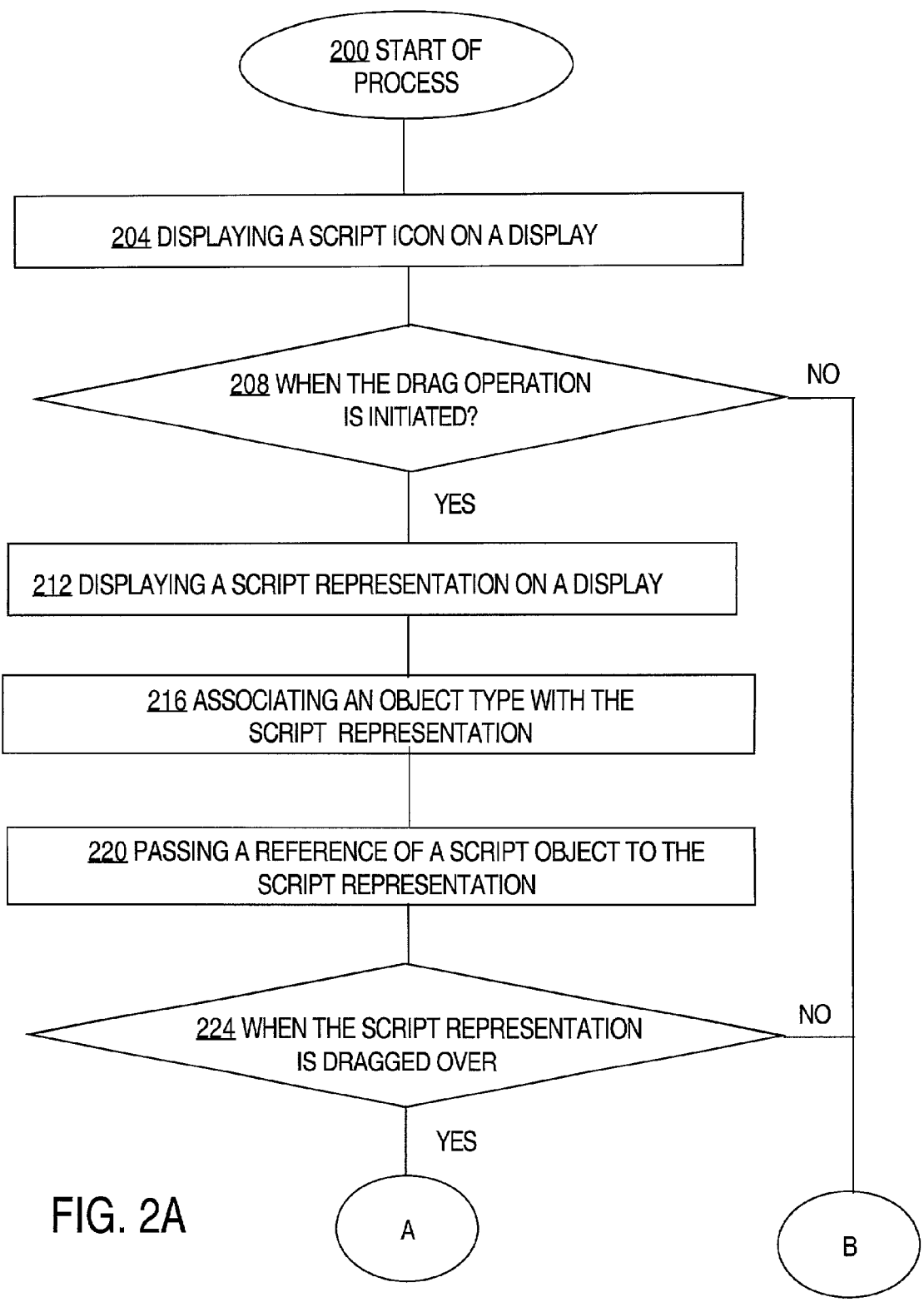
FIGS. 2A and 2B are logical flow diagrams that depict an approach for performing operations by dragging a source object, such as a script object, onto a target object, such as a graphical object, according to one embodiment of the invention.
Figure 2B:
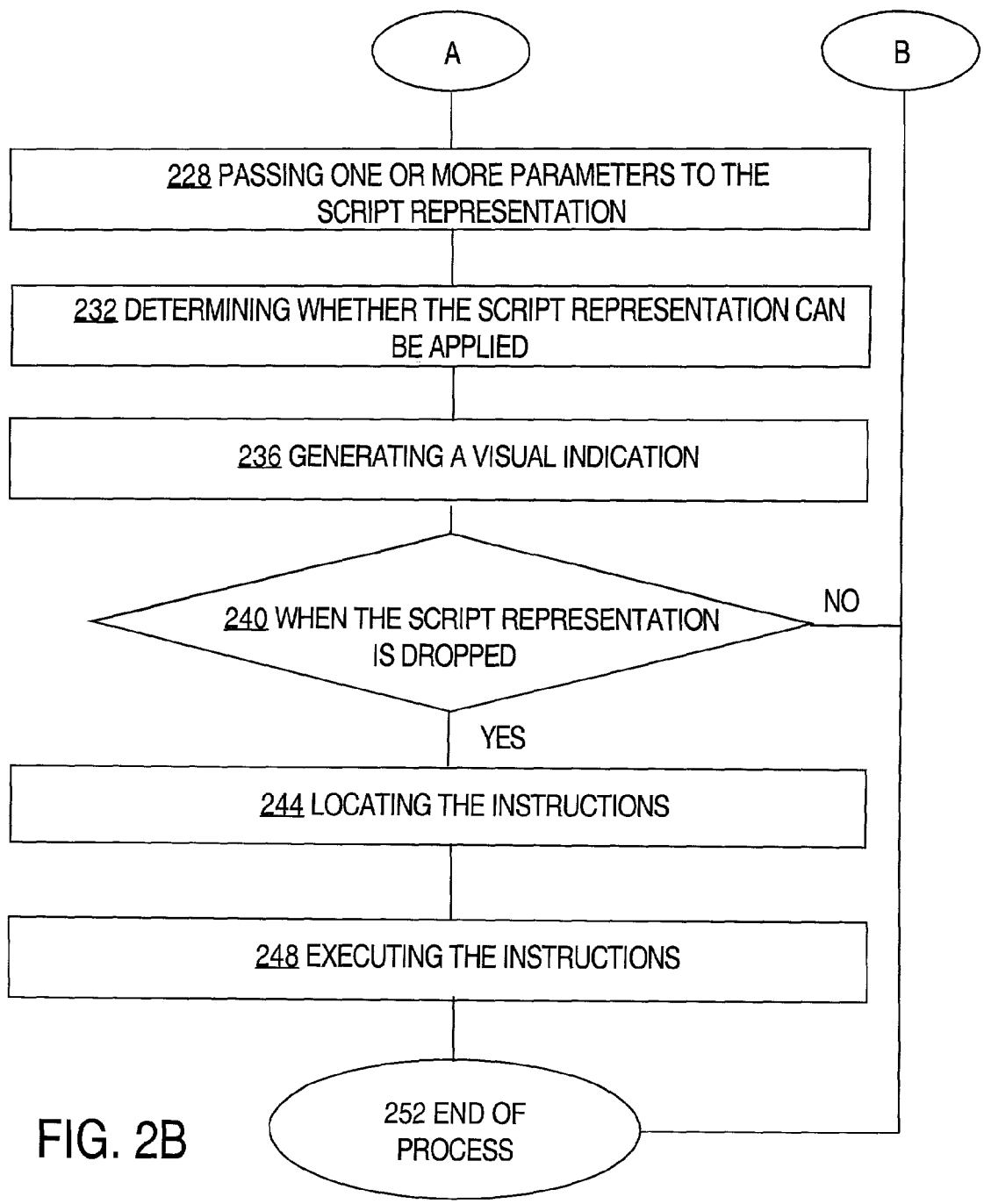

FIGS. 2A and 2B are logical flow diagrams that depict an approach for performing operations by dragging a source object, such as a script object, onto a target object, such as a graphical object, according to one embodiment of the invention. Although, FIGS. 2A and 2B are described in the context of a person using a mouse with a graphics application, other implementations may use other approaches. For example, applications other than graphics applications may use the features described herein and cursor control devices, such as a track ball or a joy stick, may be used. Although, for the purpose of explanation, FIGS. 2A and 2B are described with reference to the structures of FIGS. 1A and 1B, other structures may be used besides those of FIGS. 1A and 1B.

In block 200, the process is started. In block 204, a script icon 121 or an item in a menu 142, such as scriptobject.scr 141, is displayed on a display 100. The OLE™ drag and drop system 160 is continuously invoked as the user moves the mouse over the display 100. In so doing the OLE™ drag and drop system 160 is invoked every time the script representation 113 is dragged over window boundaries or graphical objects (111, 112).

In block 208, a drag operation is initiated. For example, a user clicks on either a script icon 121 or an item in a menu 142, such as scriptobject.scr 141, to initiate a drag operation. When the drag operation is initiated, the OLE™ drag and drop system 160 invokes the graphics application drag and drop system 150.

In block 212, the graphics application drag and drop system 150 creates script representation 113 of script object 133, and the script representation 113 is displayed on display 100. According to one embodiment, the graphics application drag and drop system 150 determines that the script object 133 is of type script object when the user first initiates the drag operation. According to one embodiment, the drop handler 133e and droppable handler 133c are located when the user first initiates the drag operation.

The graphics application drag and drop system 150 does the following: (1) associates an object type 133b with the script representation 113 in block 216, and (2) passes a reference to the script object 133 into the script representation 113 in block 220. According to one embodiment, this reference to the script object 133 is used to locate the droppable handler 133c, the drop handler 133e, and the instructions 133a, among other things, as will be described in more detail herein.

As the user drags the script representation 113 over the display 100, the graphics application drag and drop system 150 continuously: (a) invokes the droppable handler 133c as the user drags the script representation 113, and (b) passes information in the form of one or more parameters to the droppable handler 133c about what the script representation 113 is over.

In block 224, when the script representation 113 is dragged over a graphical object 111 on the display 100, one or more parameters, which include a reference to graphical object 111, are passed into the droppable handler 133c in block 228.

In block 232, the droppable handler 133c: (a) determines whether the script representation 113 is over a valid target object, such as the graphical object 111, by inspecting the one or more parameters that were passed into the droppable handler 133c which may include identifying that the object type 133b is a script object type, and (b) informs the graphics application drag and drop system 150 as to whether the script representation 113 is over a valid target object. When the script representation 113 is dropped over an invalid target object on the display 100, then droppable handler 133c is not invoked and the operation is terminated at block 252.

In block 236, a visual indication of whether the script representation 113 may be applied to the graphical object 111 is generated. For example, the script representation 113 may change shape or color depending on whether the script representation 113 may be applied to graphical object 111.

In block 240, when the script representation 113 is dropped over a valid target object, such as graphical object 111, the script representation 113 uses the reference of the script object 133 to locate the drop handler 133e and the instructions 133a in block 244.

In block 248, the graphics application drag and drop system 150 invokes the drop handler 133e with the same parameters that the graphics application drag and drop system 150 passed to the droppable handler 133c. The drop handler 133c causes the interpreter 153 to interpret instructions 133a, which perform one or more operations that involve the graphical object 111 (e.g., the target object). According to another embodiment, the instructions 133a and/or 133d are in object code that is executed. The instructions 133a use the reference to the graphical object 111, which was passed into the script representation 113 as one of the one or more parameters, to modify the graphical object 111. Once the graphical object 111 has been modified, the process ends in block 252.

Operations Performed by Script Objects

As described herein, instructions in a script object use a reference to the graphical object to modify the graphical object. Examples of using a script object to modify a graphical object include but are not limited to the following: changing the radius of the graphical object; placing other graphical objects around the graphical object; adjusting the brightness of the graphical object's texture mapping; causing the graphical objects, whether the script object is dropped on a graphical object or used to create graphical objects, to move in slow motion; creating complex animation based on equations; creating dialogues that among other things allow animators to key in game related parameters; and creating custom user interface panels that contain check boxes, sliders, and knobs where equations are used for the sliders and knobs. In general, a script object can be used for one or more operations, such as the operations described herein, for one or more target objects.

Script objects can be used to modify a graphical object into a game object. For example, script objects can be used to setup custom tools for animators so the animators can attach game related parameters to graphical objects.

Script objects can be used to create multiple graphical objects and place these graphical objects around another graphical object that the script object was dropped on. For example, handles can be attached to a cup or rocks can be spread across a surface. Furthermore, a script object can animate one or more of these graphical objects.

Third party vendors can use script objects to write plug-ins. The plug-in can then be dragged and dropped into a graphics application that supports the functionality of the script object.

An Operational Description of Zip Objects

Figure 3A:
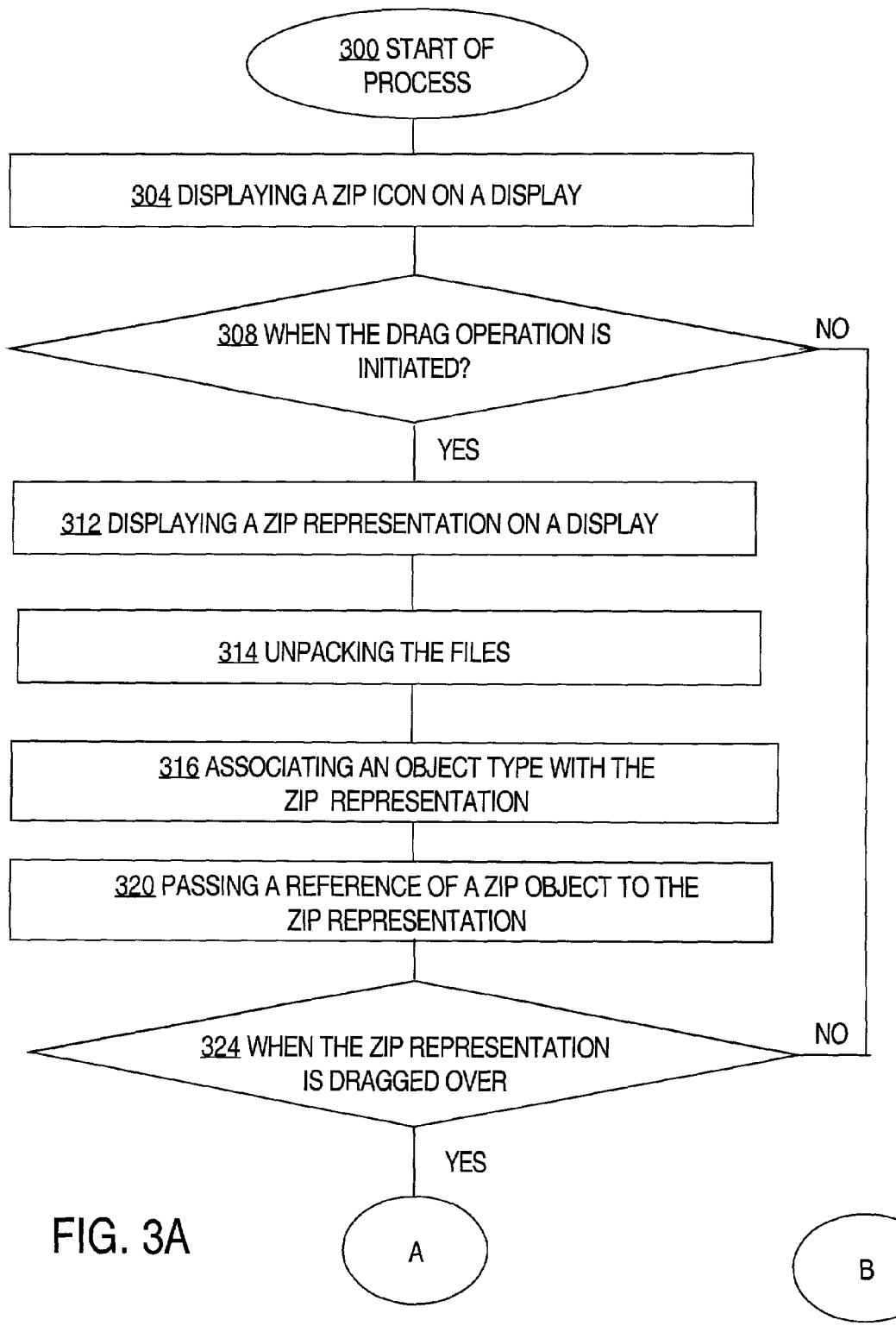
FIGS. 3A and 3B are logical flow diagrams that depict an approach for performing operations by dragging a source object, such as a zip object, onto a target object, such as a window, according to one embodiment of the invention.
Figure 3B:
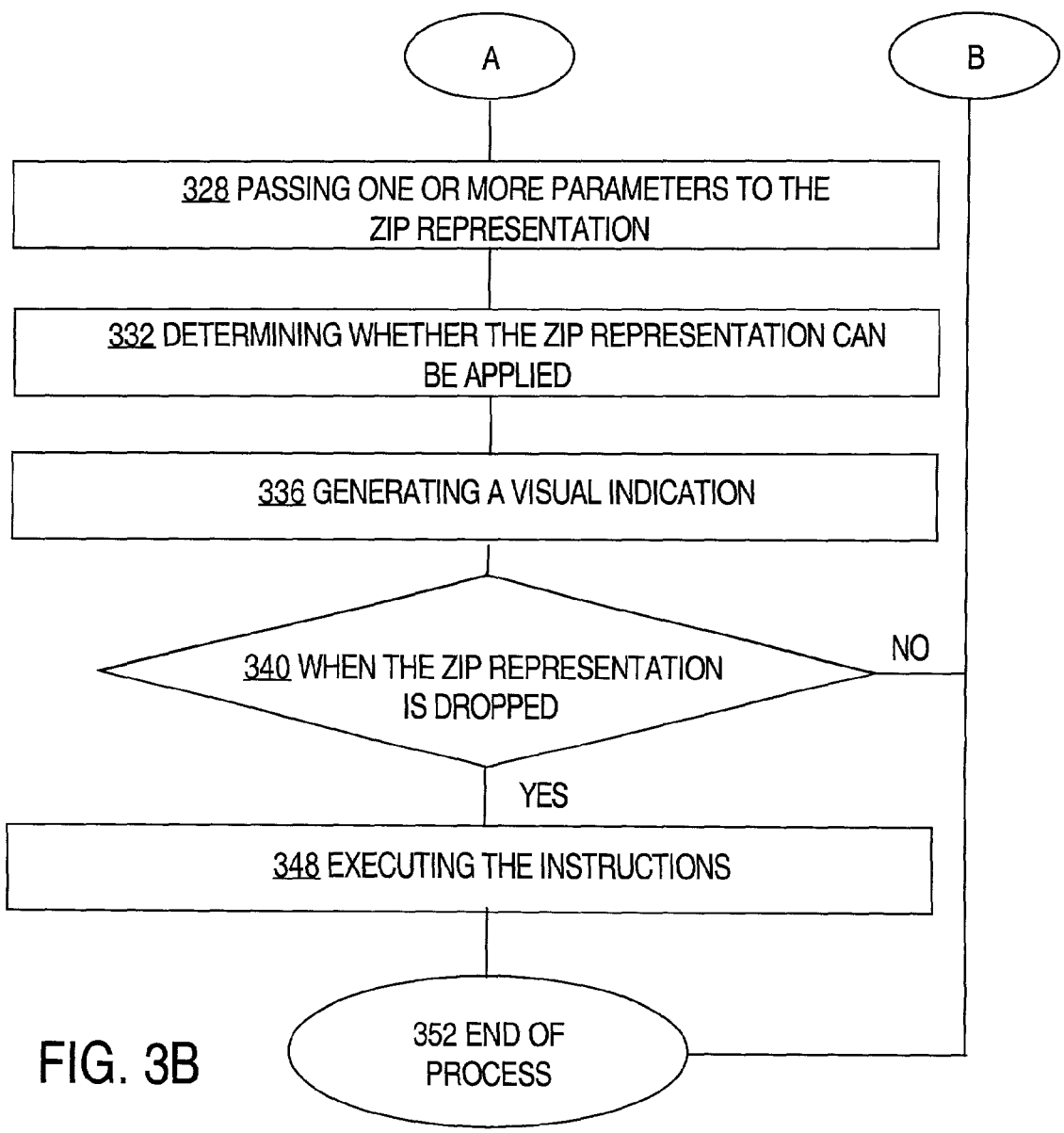

FIGS. 3A and 3B are logical flow diagrams that depict an approach for performing operations by dragging a source object, such as a zip object, onto a target object, such as a window, according to one embodiment of the invention. Although, FIGS. 3A and 3B are described in the context of a person using a mouse with a graphics application, other implementations may use other approaches. For example, applications other than graphics applications may use the features described herein and cursor control devices, such as a track ball or a joy stick, may be used.

The logical flow of using and implementing a zip object is similar to the logical flow of using and implementing a script object as described hereinabove with a few exceptions. This section describes the similarities and differences between the implementation and use of zip objects and script objects. The descriptions of blocks 200, 208, 212, 216 through 240, and 252 are equally applicable to blocks 300, 308, 312, 316 through 340, and 352 except for substituting: (1) script object 133 for zip object 137, (2) graphical object (111, 112) for window, (3) script object type 133b for zip object type 137b, 4) zipobject.zip 143 for scriptobject.scr 141, and 5) zip icon 122 for script icon 121.

The main differences in the implementation and usage of zip objects and script objects show up in blocks 304, 314, and 348. In block 304, the zip object 137 includes (1) instructions 137a via a control file, and (2) additional files 137d. In block 314, the contents of the zip object 137 are unpacked. According to one embodiment, the control file and additional files 137d are placed in a known location. This known location could be among other things a temporary directory or a directory that is specified by the instructions 137a. In block 348, the instructions 137a in the control file are executed to determine how to perform the operations that use the additional files 137d as will be described in more detail. According to one embodiment, the control file is a text file with a specified name and the instructions 137a are commands for performing the one or more operations.

Files Included in and Operations Performed by Zip Objects

Examples of the operations that use the additional files include, but are not limited to the following: extracting the additional files from the zip object; placing the additional files in a specified directory; instantiating graphical objects; installing objects such as images or scenes; running script objects; and dropping script objects onto a specified graphical object. One or more of the additional files can be imported to install the additional files into scenes. According to one embodiment, zip objects are used for installations that require coordination of related objects, such as graphical objects, backgrounds, scenes, etc. Plug-in users can perform installations by dragging a zip object from their web page onto a window that supports zip objects.

According to one embodiment, at least one of the additional files is a script object. According to another embodiment, the zip object includes one script object, which may in turn invoke one or more other script objects. By having a predetermined directory or by specifying a directory in instructions 137a, the one or more script objects associated directly or indirectly with the zip object 137 do not need to specify the directory path of the additional files 137d in the zip object 137 when the script objects reference these additional files 137d.

The script objects, included in the zip object, may perform tasks that require certain files to be in the zip object to accomplish the task. For example, a zip object can be used to install several different backgrounds. Examples of backgrounds are trees, stars, ground, and tree covered mountains. Then the zip object can perform operations that create objects on top of these backgrounds.

Other Variations

According to one embodiment, a zip file is an example of a source object, in which case a representation of the zip file is dropped on a target object. A zip file is a file that includes one or more files that are often, but not always, compressed.

A representation of a script object can be dropped on any target object, such as a graphical object, a window, a viewport, a background, or a scene, in which case, one or more parameters associated with the graphical object, window, viewport, background, or scene is passed into the representation.

A representation of a zip object can be dropped on any target object, such as a graphical object, a window, a viewport, a background, or a scene, in which case, one or more parameters associated with the graphical object, window, viewport, background, or scene are passed into the representation. According to one embodiment, a reference to or an indicator of the graphics application is passed into the representation of the source object when the representation is dropped on a window associated with the graphics application for example. This is useful in the event that zip objects are used for installing files or features into the graphics application.

In the context of a drag and drop implementation, script objects that are dragged and dropped maybe referred to as drop scripts.

In the context of a drag and drop implementation, zip objects that are dragged and dropped maybe referred to as drop zips.

Other mechanisms besides an object type maybe used for identifying script objects and zip objects. According to one embodiment, a file type of a source object's filename is used to determine the type of the source object instead of the object type (133$b$, 137$b$). For example, the file type of zipobject.zip 143 is "zip" and the file type of scriptobject.scr 141 is "scr", in which case the file type "scr" is used to determine that script object 133 is of type script and the file type "zip" is used to determine that zip object 137 is of type zip. According to one embodiment, the object type (133$b$, 137$b$) are not included in the source objects (133, 137).

The functionality of dragging and dropping maybe implemented in different places than as described herein. Furthermore the droppable handler and the drop handler need not be implemented in the script object or zip object. Alternatively, the handlers may be stand alone functions or in other objects.

According to one embodiment, a zip object is implemented as part of a WinZip file that includes the control file and the additional files. Furthermore, this WinZip file may come from among other things a third party developer's website.

According to another embodiment, a reference to the target object is passed to the source object. For example, the source object can contain one or more sequences of instructions that include a variable that is used in the instructions to refer to the target object. When the visual representation of the source object is dropped onto the target object, the graphics application drag and drop system 150 can pass the reference, based on the target object, into the instructions of the source object such that when the interpreter 153 interprets the instructions, the operations are performed. As another example, the reference can be substituted for the variable in the instructions in memory 130 such that the instructions can be executed to perform the operations. These examples do not necessarily require that the reference be passed to the visual representation of the source object, as in the case in which the visual representation of the source object is a graphical image that is displayed on the screen without the capability to perform actions itself.

Hardware Overview

The approach for performing operations using drag and drop features described herein may be implemented in a variety of ways and the invention is not limited to any particular implementation. The approach may be integrated into a computer system or a graphics card, or may be implemented as a stand-alone mechanism. Furthermore, the approach may be implemented in computer software, hardware, or a combination thereof.

Figure 4:
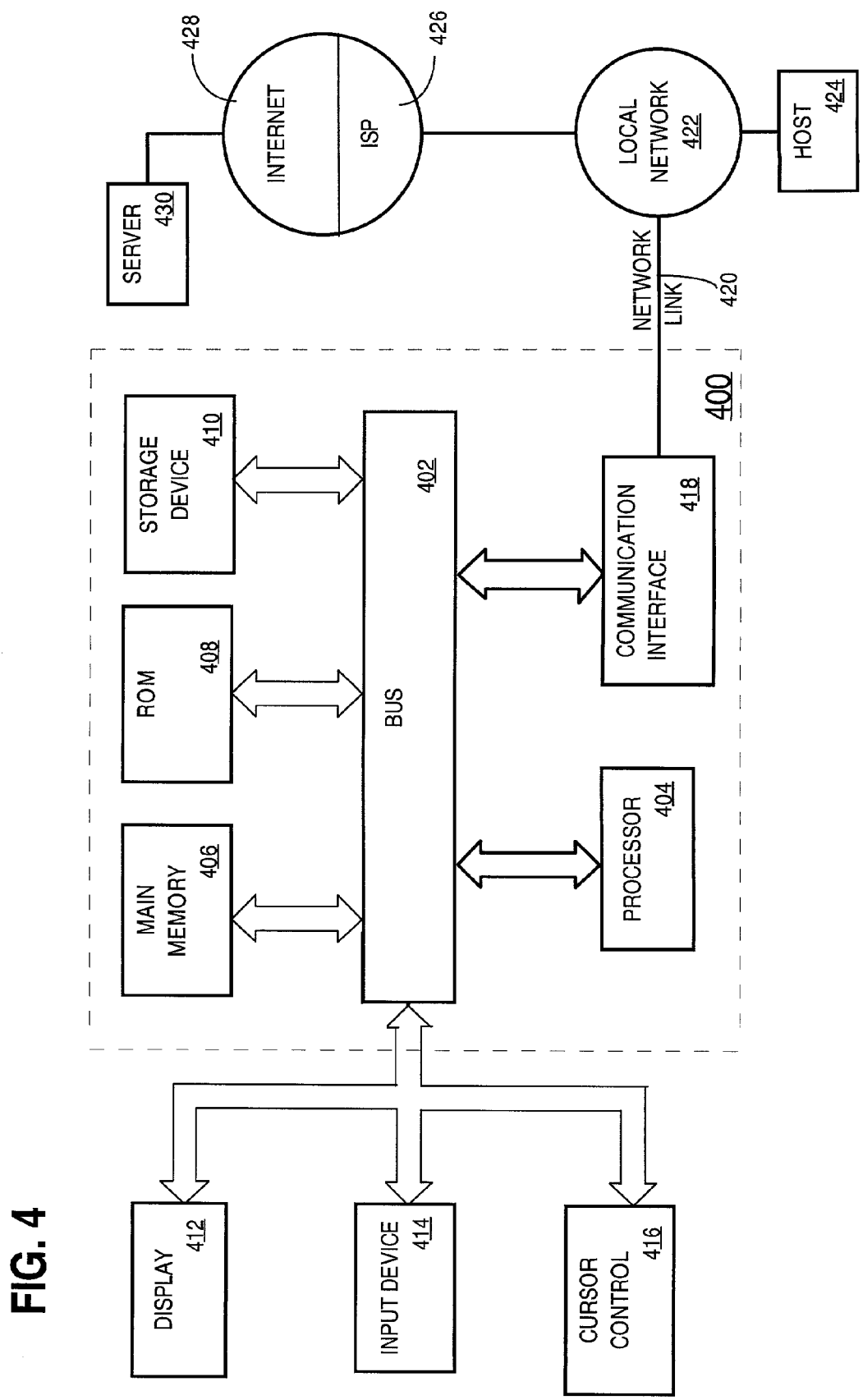
FIG. 4 is a block diagram that depicts a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. For example, although examples have illustrated the use of script objects and zip objects, the script objects and zip objects are used for explanation purposes only as embodiments of the invention are not limited to any particular type of source object. For example, although examples have illustrated the use of graphical objects, the graphical objects are used for explanation purposes only as embodiments of the invention are not limited to any particular type of target object. Thus, the specification and drawings are, accordingly, to be regarded in an illustrative rather than a restrictive sense. The invention includes other contexts and application in which the mechanisms and processes described herein are available to other mechanisms, methods, programs, and processes.

What is claimed is:

1. A method for performing operations, the method comprising the steps of:

displaying, on a display, a representation of a source object, wherein the source object includes one or more sequences of instructions for performing one or more operations;

detecting that the representation of the source object is dragged over and dropped onto a target object, wherein the target object is a graphical target object and the step of detecting is performed by detecting that the representation of the source object is dragged over and dropped onto the graphical target object within a graphics application; and when the representation of the source object is dragged over and dropped onto the target object on the display, executing the one or more sequences of instructions to perform the one or more operations in a manner that involves the target object.

2. The method of claim 1, wherein the method further comprises the step of identifying an object type that is associated with the source object; and wherein the step of executing is performed by executing the one or more sequences of instructions, based on the object type, to perform the one or more operations.

3. The method of claim 2, wherein the step of executing is performed by:

determining whether the object type is a script object type; and when the object type is determined to be the script object type, executing the one or more sequences of instructions to perform the one or more operations.

4. The method of claim 2, wherein the step of executing is performed by:

determining whether the object type is a zip object type; and when the object type is determined to be the zip object type, storing two or more files that are included in a zip object, and executing at least one file of the two or more files.

5. The method of claim 1, wherein the step of executing the one or more sequences of instructions to perform the one or more operations includes the step of modifying at least one parameter that is associated with the target object.

6. The method of claim 1, wherein the step of executing the one or more sequences of instructions to perform the one or more operations includes the step of modifying the target object.

7. The method of claim 1, wherein the target object is a part of a scene, and wherein the step of detecting includes detecting that the representation of the source object is dragged over and dropped onto the target object in the scene.

8. The method of claim 1, wherein the step of executing the one or more sequences of instructions to perform the one or more operations includes the step of generating one or more graphical objects.

9. The method of claim 8, wherein the one or more graphical objects includes a menu.

10. The method of claim 1, wherein the step of detecting that the representation of the source object is dragged over and dropped onto the target object includes the step of passing one or more parameters, based on the target object, to the representation of the source object.

11. The method of claim 1, wherein the step of detecting that the representation of the source object is dragged over and dropped onto the target object includes the step of passing a parameter, based on the target object, to the source object.

12. The method of claim 1, wherein the step of detecting that the representation of the source object is dragged over and dropped onto the target object includes the step of substituting a parameter, based on the target object, for a variable in the one or more sequences of instructions.

13. The method of claim 1, wherein the method further includes the steps of:
determining whether the representation of the source object can be applied to the target object; and
generating a visual indication of whether the representation of the source object can be applied to the target object.

14. The method of claim 1, wherein the target object is an object selected from the group consisting of an animation object, a window, a viewport, a background, and a scene.

15. The method of claim 1, wherein the source object is a graphical source object and the step of displaying is performed by displaying, on the display, a representation of the graphical source object in a graphics application.

16. The method of claim 1, wherein the source object is an object selected from the group consisting of an script object, a drop script, a zip object, a zip file, and a drop zip.

17. The method of claim 1, wherein the source object is a zip object that includes a control file and one or more additional files, and the control file includes the one or more sequences of instructions, wherein
the method further comprises
when the representation of the source object is dragged over and dropped onto the target object, unpacking the control file and the one or more additional files from the zip object; and
the step of executing is performed by
executing the one or more sequences of instructions in the control file to determine how to perform the one or more operations using the one or more additional files.

18. The method of claim 17, wherein one file of the one or more additional files is a script file.

19. The method of claim 1, wherein the source object is a file that includes source code and the one or more sequences of instructions is the source code in the file and wherein:
the step of displaying is performed by
displaying, on the display, a representation of the file that is associated with the source code; and
the step of executing is performed by
executing the source code to perform the one or more operations in a manner that involves the target object.

20. The method of claim 1, wherein the step of executing is performed by executing the one or more sequences of instructions to perform the one or more operations, based on a reference to the target object.

21. The method of claim 1, wherein the step of executing the one or more sequences of instructions to perform the one or more operations includes the step of locating the one or more sequences of instructions based on a reference to the source object.

22. The method of claim 1, wherein the representation of the source object is a second representation that is generated when a drag operation is initiated on a first representation of the source object and the first representation is selected from the group consisting of an icon, an item on a menu, and a button on a tool bar.

23. The method of claim 22, wherein the icon is on a web page.

24. The method of claim 1, wherein the one or more sequences of instructions are interpreted.

25. The method of claim 1, further comprising the step of dragging and dropping the representation of the source object onto the target object using a cursor control device.

26. The method of claim 1, wherein the source object includes one or more additional files, a particular additional file of the one or more additional files is a script object that includes the one or more sequences of instructions in the script object to perform the one or more operations in a manner that involves the target object.

27. The method of claim 1, wherein the source object includes one or more additional files, a particular additional file of the one or more additional files is a script object that includes at least one of a drop handler or a droppable handler.

28. The method of claim 1, wherein the source object is a zip object that includes at least one of a drop handler or a droppable handler.

29. The method of claim 1, wherein the step of executing is caused by a default drop handler.

30. The method of claim 1, wherein the method further includes the step of detecting, in a default droppable handler, whether the representation 6fthe source object can be applied to the target object.

31. The method of claim 1, wherein the representation of the source object is a second representation that is generated when a drag operation is initiated on a first representation of the source object and the first representation has a file type that is used to determine the type of the source object.

32. A method for performing operations, the method comprising the steps of:
displaying, on a display, a first representation of a script object, wherein the script object includes one or more sequences of instructions for performing one or more operations;

when a drag operation of the first representation is initiated,
displaying a second representation of the script object,
associating an object type, based on the script object, with the second representation,
passing a first reference, based on the script object, to the second representation;
when the second representation is dragged over a graphical object on the display,
passing one or more parameters, based on the graphical object, to the second representation,
determining whether the second representation can be applied to the graphical object by inspecting the one or more parameters and by identifying a script object type based on the object type,
generating a visual indication of whether the second representation can be applied to the graphical object; and
when the second representation is dropped onto the graphical object on the display,
locating the one or more sequences of instructions based on the first reference,
based on the script object type, executing the one or more sequences of instructions to perform the one or more operations,
wherein the one or more sequences of instructions reference the graphical object using the one or more parameters.

33. A method for performing operations, the method comprising the steps of:
displaying, on a display, a first representation of a zip object, wherein the zip object includes
a control file that includes one or more sequences of instructions for performing one or more operations, and
one or more additional files;
when a drag operation of the first representation is initiated,
displaying a second representation of the zip object,
unpacking the control file and the one or more additional files from the zip object,
associating an object type, based on the zip object, with the second representation,
passing a first reference, based on the zip object, to the second representation;
when the second representation is dragged over a window on the display,
passing one or more parameters, based on the window, to the second representation,
determining whether the second representation can be applied by inspecting the one or more parameters and by identifying a zip object type based on the object type,
generating a visual indication of whether the second representation can be applied; and
when the second representation is dropped onto the window on the display,
executing the one or more sequences of instructions in the control file to determine how to perform the one or more operations using the one or more additional files,
wherein the one or more operations use the one or more parameters.

34. An apparatus for performing operations, the apparatus comprising:
a source object that has a representation capable of being dragged over and dropped onto a graphical target objects within a graphics application;
a mechanism configured to detect that the representation of the source object is dragged over and dropped onto the graphical target object; and
a mechanism configured to execute one or more sequences of instructions associated with the source object with reference to a particular graphical target object in response to the representation being dragged over and dropped onto the particular graphical object.

35. The apparatus of claim 34, wherein the mechanism is a droppable handler.

36. The apparatus of claim 34, wherein the mechanism is a drop handler.

37. The apparatus of claim 34, wherein the mechanism is further configured to:
determine whether the source object can be applied to the particular graphical object; and
generate a visual indication of whether the source object can be applied to the particular graphical object.

38. A computer-readable medium carrying one or more sequences of instructions for performing operations, wherein execution of the one or more sequences of instructions by one or more processors causes the one or more processors to perform the steps of:
displaying, on a display, a representation of a source object, wherein the source object includes one or more sequences of instructions for performing one or more operations;
detecting that the representation of the source object is dragged over and dropped onto a target object wherein the target object is a graphical target object and the step of detecting is performed by detecting that the representation of the source object is dragged over and dropped onto the graphical target object within a graphics application; and
when the representation of the source object is dragged over and dropped onto the target object on the display, executing the one or more sequences of instructions to perform the one or more operations in a manner that involves the target object.

39. The computer-readable medium of claim 38,
wherein the steps further include identifying an object type that is associated with the source object; and
wherein the step of executing is performed by executing the one or more sequences of instructions, based on the object type, to perform the one or more operations.

40. The computer-readable medium of claim 39, wherein the step of executing is performed by:
determining whether the object type is a script object type; and
when the object type is determined to be the script object type, executing the one or more sequences of instructions to perform the one or more operations.

41. The computer-readable medium of claim 39, wherein the step of executing is performed by:
determining whether the object type is a zip object type; and
when the object type is determined to be the zip object type,
storing two or more files that are included in a zip object, and executing at least one file of the two or more files.

42. The computer-readable medium of claim 38, wherein the step of executing the one or more sequences of instructions to perform the one or more operations includes the step of modifying at least one parameter that is associated with the target object.

43. The computer-readable medium of claim 38, wherein the step of executing the one or more sequences of instructions to perform the one or more operations includes the step of modifying the target object.

44. The computer-readable medium of claim 38, wherein the target object is a part of a scene, and wherein the step of detecting includes detecting that the representation of the source object is dragged over and dropped onto the target object in the scene.

45. The computer-readable medium of claim 38, wherein the step of executing the one or more sequences of instructions to perform the one or more operations includes the step of generating one or more graphical objects.

46. The computer-readable medium of claim 45, wherein the one or more graphical objects includes a menu.

47. The computer-readable medium of claim 38, wherein the step of detecting that the representation of the source object is dragged over and dropped onto the target object includes the step of passing one or more parameters, based on the target object, to the representation of the source object.

48. The computer-readable medium of claim 47, wherein the step of detecting that the representation of the source object is dragged over and dropped onto the target object includes the step of passing a parameter, based on the target object, to the source object.

49. The computer-readable medium of claim 47 wherein the step of detecting that the representation of the source object is dragged over and dropped onto the target object includes the step of substituting a parameter, based on the target object, for a variable in the one or more sequences of instructions.

50. The computer-readable medium of claim 47, wherein the method further includes the steps of:
   determining whether the representation of the source object can be applied to the target object; and
   generating a visual indication of whether the representation of the source object can be applied to the target object.

51. The computer-readable medium of claim 38, wherein the target object is an object selected from the group consisting of an animation object, a window, a viewport, a background, and a scene.

52. The computer-readable medium of claim 38, wherein the source object is a graphical source object and the step of displaying is performed by displaying, on the display, a representation of the graphical source object in a graphics application.

53. The computer-readable medium of claim 38, wherein the source object is an object selected from the group consisting of a script object, a drop script, a zip object, a zip file, and a drop zip.

54. The computer-readable medium of claim 38, wherein the source object is a zip object that includes a control file and one or more additional files, and the control file includes the one or more sequences of instructions, wherein
   the steps further include
      when the representation of the source object is dragged over and dropped onto the target object, unpacking the control file and the one or more additional files from the zip object; and
   the step of executing is performed by
      executing the one or more sequences of instructions in the control file to determine how to perform the one or more operations using the one or more additional files.

55. The computer-readable medium of claim 54, wherein one file of the one or more additional files is a script file.

56. The computer-readable medium of claim 38, wherein the source object is a file that includes source code and the one or more sequences of instructions is the source code in the file and wherein:
   the step of displaying is performed by
      displaying, on the display, a representation of the file that is associated with the source code; and
   the step of executing is performed by
      executing the source code to perform the one or more operations in a manner that involves the target object.

57. The computer-readable medium of claim 38, wherein the step of executing is performed by executing the one or more sequences of instructions to perform the one or more operations, based on a reference to the target object.

58. The computer-readable medium of claim 38, wherein the step of executing the one or more sequences of instructions to perform the one or more operations includes the step of locating the one or more sequences of instructions based on a reference to the source object.

59. The computer-readable medium of claim 38, wherein the representation of the source object is a second representation that is generated when a drag operation is initiated on a first representation of the source object and the first representation is selected from the group consisting of an icon, an item on a menu, and a button on a tool bar.

60. The computer-readable medium of claim 59, wherein the icon is on a web page.

61. The computer-readable medium of claim 38, wherein the one or more sequences of instructions are interpreted.

62. The computer-readable medium of claim 38, further comprising the step of dragging and dropping the representation of the source object onto the target object using a cursor control device.

63. The computer-readable medium of claim 38, wherein the source object includes one or more additional files, a particular additional file of the one or more additional files is a script object that includes the one or more sequences of instructions in the script object to perform the one or more operations in a manner that involves the target object.

64. The computer-readable medium of claim 38, wherein the source object includes one or more additional files, a particular additional file of the one or more additional files is a script object that includes at least one of a drop handler or a droppable handler.

65. The computer-readable medium of claim 38, wherein the source object is a zip object that includes at least one of a drop handler or a droppable handler.

66. The computer-readable medium of claim 38, wherein the step of executing is caused by a default drop handler.

67. The computer-readable medium of claim 38, wherein the method further includes the step of detecting, in a default droppable handler, whether the representation of the source object can be applied to the target object.

68. The computer-readable medium of claim 38, wherein the representation of the source object is a second representation that is generated when a drag operation is initiated on a first representation of the source object and the first representation has a file type that is used to determine the type of the source object.

69. A computer-readable medium carrying one or more sequences of instructions for performing operations, wherein execution of the one or more sequences of instructions by one or more processors causes the one or more processors to perform the steps of:
- displaying, on a display, a first representation of a script object, wherein the script object includes one or more sequences of instructions for performing one or more operations;
- when a drag operation of the first representation is initiated,
  - displaying a second representation of the script object,
  - associating an object type, based on the script object, with the second representation,
  - passing a first reference, based on the script object, to the second representation;
- when the second representation is dragged over a graphical object on the display,
  - passing one or more parameters, based on the graphical object, to the second representation,
  - determining whether the second representation can be applied to the graphical object by inspecting the one or more parameters and by identifying a script object type based on the object type,
  - generating a visual indication of whether the second representation can be applied to the graphical object; and
- when the second representation is dropped onto the graphical object on the display,
  - locating the one or more sequences of instructions based on the first reference,
  - based on the script object type, executing the one or more sequences of instructions to perform the one or more operations,
  - wherein the one or more sequences of instructions reference the graphical object using the one or more parameters.

70. A computer-readable medium carrying one or more sequences of instructions for performing operations, wherein execution of the one or more sequences of instructions by one or more processors causes the one or more processors to perform the steps of:
- displaying, on a display, a first representation of a zip object, wherein the zip object includes
  - a control file that includes one or more sequences of instructions for performing one or more operations, and
  - one or more additional files;
- when a drag operation of the first representation is initiated,
  - displaying a second representation of the zip object,
  - unpacking the control file and the one or more additional files from the zip object,
  - associating an object type, based on the zip object, with the second representation,
  - passing a first reference, based on the zip object, to the second representation;
- when the second representation is dragged over a window on the display,
  - passing one or more parameters, based on the window, to the second representation,
  - determining whether the second representation can be applied by inspecting the one or more parameters and by identifying a zip object type based on the object type,
  - generating a visual indication of whether the second representation can be applied; and
- when the second representation is dropped onto the window on the display,
  - executing the one or more sequences of instructions in the control file to determine how to perform the one or more operations using the one or more additional files,
  - wherein the one or more operations use the one or more parameters.

* * * * *

UNITED STATES PATENT AND TRADEMARK OFFICE
CERTIFICATE OF CORRECTION

PATENT NO.        : 7,019,743 B1                                            Page 1 of 1
APPLICATION NO.   : 10/153218
DATED             : March 28, 2006
INVENTOR(S)       : Wainwright et al.

It is certified that error appears in the above-identified patent and that said Letters Patent is hereby corrected as shown below:

On the front page of the patent, Item (60), Related U.S. Application Data:

Change "May 31, 2001" to --May 22, 2001--

Signed and Sealed this

Twenty-seventh Day of February, 2007

JON W. DUDAS
*Director of the United States Patent and Trademark Office*